Aug. 8, 1944.   C. L. DAUN   2,355,205
FAUCET FOR DISPENSING CARBONATED BEVERAGES
Filed April 16, 1941
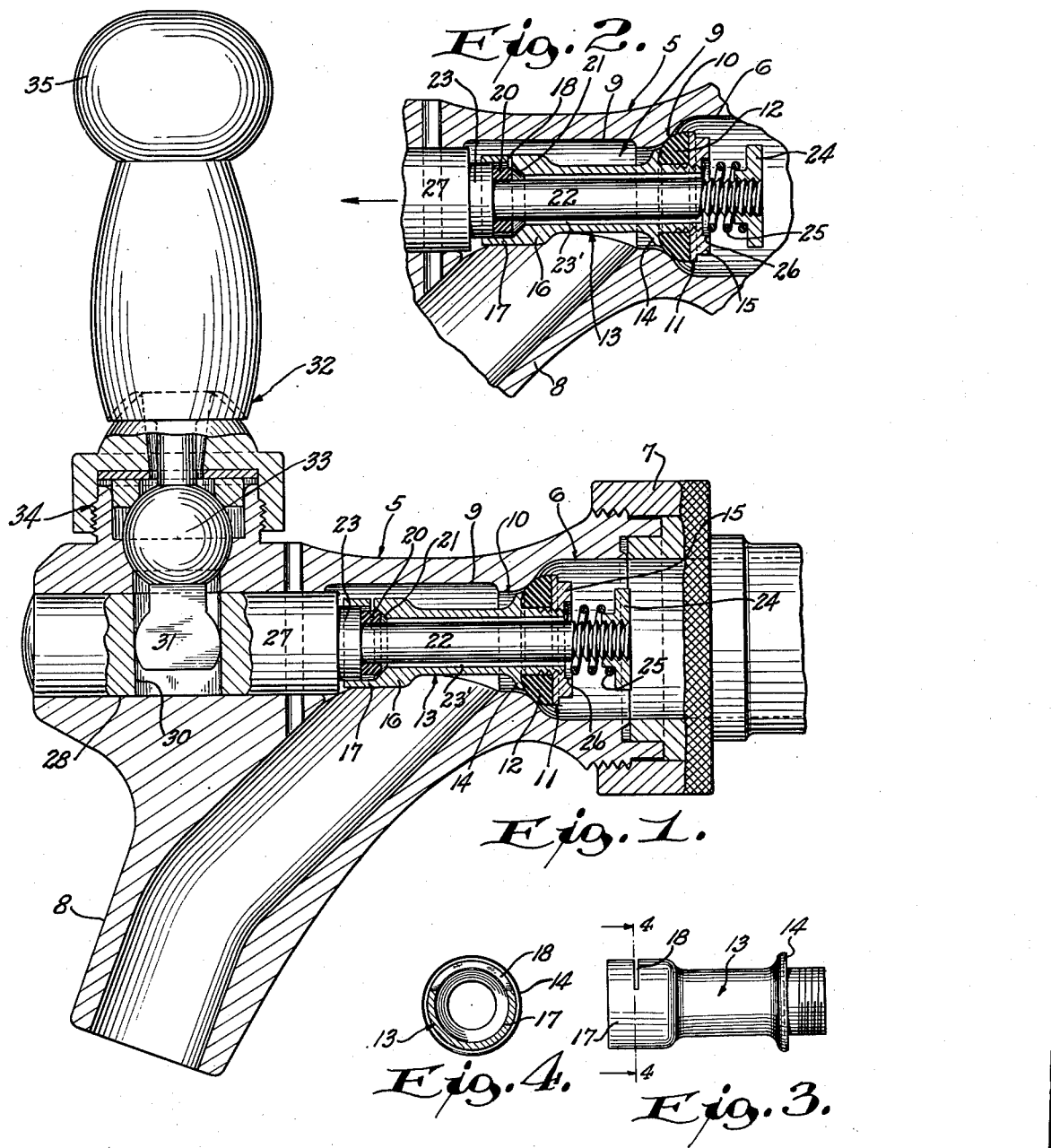
INVENTOR.
CARL L. DAUN.
BY John W. Michael
ATTORNEY Patented Aug. 8, 1944

2,355,205

UNITED STATES PATENT OFFICE 2,355,205

FAUCET FOR DISPENSING CARBONATED BEVERAGES

Carl L. Daun, Milwaukee, Wis., assignor to Chill-Quick Corporation, a corporation of Wisconsin Application April 16, 1941, Serial No. 388,755

5 Claims. (Cl. 225—6)

This invention relates to an improvement in faucets especially designed and adapted for dispensing carbonated beverages, for instance, beer.

To draw or dispense beer quickly, and yet serve it appetizingly, the glass, mug, stein, or other drinking vessel, first, should be almost completely filled with the beer in an undisturbed condition, that is, with the activating carbon dioxide gas in the beer completely, or substantially completely, retained therein in an absorbed or dissolved state, and finally the drawn beer should be supplied with the so-called "collar" or "head," that is, with a top strata or layer of beer foam in which the carbon dioxide gas is released from its condition of absorption or solution, but is retained in a state of dispersion or suspension in the form of minute globules of gas surrounded by films of the liquor. And the more finely divided the globules and their surrounding films, and the more stable their state of dispersion or suspension the richer or creamier is the foam or head.

The object of the present invention is to provide a faucet so constructed and organized that beer may be drawn or dispensed therefrom in the manner just described and this with convenience and facility and without requiring any special skill or care on the part of the bartender or other person drawing or dispensing the beer. In fact, the device is fool-proof in that but two simple movements or manipulations of the operating knob of the faucet are required and these are such that may not be confused by any one exercising ordinary intelligence.

Another object of the invention is to provide a faucet of this character and having these advantages and capacities, and which is simple, compact, and closely organized in construction, reliable and efficient in use, readily and easily disassembled for purposes of inspection, replacement or repair of its parts, and adapted to be manufactured with economy and facility by instrumentalities and from materials ordinarily available.

Other objects and advantages reside in certain novel features of the construction, arrangement, and combination of parts which will be hereinafter more fully described and particularly pointed out in the appended claims, reference being had to the accompanying drawing forming a part of this specification, and in which:

Figure 1 is a view partly in side elevation and partly in central, vertical, longitudinal cross section, illustrating a faucet constructed in accordance with the present invention, both the beer valve and the foam valve embodied in the faucet being shown closed;

Figure 2 is a fragmentary view similar to Figure 1 but illustrating the beer valve closed and the foam valve open;

Figure 3 is a detail view in side elevation of the carrier sleeve embodied in the faucet; and Figure 4 is a view in transverse, vertical cross section taken on line 4—4 of Figure 3.

Referring to the drawing, and more particularly to Figure 1, the numeral 5 designates generally the hollow body of the faucet. The faucet body 5 is provided with an inlet nipple 6 externally threaded to adapt it for connection by means of a suitable coupling member 7 to the source of supply of the beer or carbonated beverage to be dispensed.

The term "beer" as used in the specification and claims of this application is intended to comprehend not only the familiar alcoholic fermented liquor made from malt and hops, but also to the other slightly fermented beverages made from the roots, etc., of various plants, for example, sassafras, ginger, spruce, or the like, as well as to other carbonated beverages.

The faucet body 5 is also provided with an outlet which usually takes the form of a discharge spout 8. A passage-way 9 in the faucet body 5 leads directly from the inlet 6 to the outlet 8, and in between the inlet 6 and the outlet 8 the faucet body is provided with a valve seat 10, the operative face of which is presented to the inlet side of the passageway 9.

A beer valve, designated generally at 11, is provided to control the flow of beer past the valve seat 10. The beer valve is constituted so that when it is opened it will provide for flow from the faucet of a relatively large volume of beer at a low velocity. Consequently, the beer will flow from the discharge spout 8 into the drinking vessel without any material amount of foam or froth. This expedites the filling of the drinking vessel.

In the construction illustrated, the beer valve 11 comprises an annular valve head 12 of some suitable elastic material or composition. The valve head 12 is disposed on the inlet side of the valve seat 10 and is cooperable with the operative face of the valve seat. The annular valve head 12 is mounted on a carrier sleeve, designated generally at 13, one face of the head 12 abutting an annular flange 14 which may be integrally formed of the carrier sleeve 13. A nut 15 is threaded on the end of the sleeve on which the head 12 is mounted and presses the head between itself and the flange 14, thereby rigidly securing the head to the carrier sleeve 13.

The carrier sleeve 13 extends through the valve seat 10 and into the part of the passage-way 9 located on the outlet side of the valve seat. The end of the sleeve 13 opposite the valve head 12 is enlarged, as at 16, and this enlarged portion is provided with a cylindrical valve chamber 17. The valve chamber 17 has a portion of its peripheral wall slotted, as at 18. The slot 18 is narrow and extends only part way around the peripheral wall of the valve chamber 17 and provides a restricted discharge orifice from the valve chamber to the passage 9 on the outlet side of the valve seat 10.

A foam valve 20 is provided to control the flow of foam from the restricted discharge orifice or slot 18. This valve 20 may be in the form of a ring of elastic material of suitable composition, and it is reciprocable in the valve chamber 17 so as to block or open the discharge orifice. The foam valve 20 coacts with the valve seat 21 formed on the inner wall of the valve chamber 17 in its closed position. The foam valve 20 is fixed to a valve stem 22 which extends through the carrier sleeve 13. The outside diameter of the stem 22 is slightly less than the inside diameter of the sleeve 13 so that the stem and sleeve coact to define a passage-way 23' open at its inner end to the inlet 6 and communicating with the interior of the valve chamber or shut off therefrom depending upon the position of the valve 20. The valve 20 is preferably a tight friction fit on the stem 22 and abuts a shoulder presented by an integral step 23 of the stem 22, the step 23 being a portion of the stem of somewhat greater diameter than the stem 22 proper, and having a sliding or guiding fit with the inner wall of the valve stem 17. The inner end of the stem 22 projects beyond the inner end of the sleeve 13 and its nut 15, and the projecting portion thereof is externally threaded to receive an adjusting nut 24 which serves as an abutment for one end of a coil spring 25, encircling the projecting portion of the valve stem and abutting not only the nut 24 but also the seat 26 provided therefor in the nut 15. The tension of the spring may be varied by adjusting the nut 24. The spring 25 serves to yieldably interconnect the valve stem 22 with the beer valve 11 for a purpose which will hereinafter more clearly appear.

Outwardly beyond the step 23 the valve stem 22 is further enlarged to provide a cylindrical valve guide 27 which is a sliding fit in a guide-way 28 provided therefor in the body of the faucet. The guide-way 28 is coaxial with the valve seat and the beer and foam valves, and thereby these valves 11 and 20 are constrained to reciprocating movement along their common axes and the axis of the valve seat.

The valve guide 27 is formed with a transverse slot 30 to adapt it to be interfitted with the flattened and rounded lower arm 31 of a valve-operating lever, designated generally at 32. The lever 32 is fulcrumed on the body of the faucet. Preferably this is accomplished by providing the lever with a ball 33 which is rockably fitted in a socket structure 34 shown to advantage in Figure 1. The details of this socket structure are per se no part of the present invention, but they are clearly shown in Figure 1. A knob 35 is provided on the lever to adapt it to be comfortably grasped by the hand of the bartender or the persons drawing or dispensing the beer.

With the construction described, when a glass of beer is drawn the person drawing the beer grasps the knob 15 and pulls it toward him. This rocks the lever 32 in a counter-clockwise direction as viewed in Figure 1, thereby shifting the valve guide 27 and its integral valve stem 22 to the right, as viewed in Figure 1. Such movement leaves the foam valve 20 engaged with its seat, and in fact its engagement is enhanced since the motion is transmitted from the valve guide through step 23 and valve 20 to the carrier 13, and from the carrier to the beer valve 11. The beer valve is designed and proportioned so that when it is open, beer flows in a comparatively large volume but at a low velocity, past the beer valve and out through the discharge spout into the drinking vessel. As the result the drinking vessel is filled with beer in an undisturbed condition—that is with the carbon dioxide gas retained or dissolved or absorbed therein. When the drinking vessel has been filled almost to the top the operator moves the lever 32 back to the vertical position shown in Figure 1, which closes the beer valve 12. The beer valve is held closed by the pressure thereagainst exerted by the beer in the inlet 6, or, if desired, a spring could be provided for this purpose. The important feature is that the beer valve is biased to closed position.

Now then, to supply the beer in the drinking vessel with a head or collar of foam, the operator presses rearwardly on the operating lever—that is, he presses it away from him or in a clockwise direction as viewed in Figure 1. Such movement of the lever 35 slides the valve guide 27 to the left as viewed in Figure 1. Movement of the valve guide 27 to the left as viewed in Figure 1 pulls the valve stem 22 with it, and consequently compresses the spring 25 interposed between the nut 24 and the nut 15. This action results in the beer valve 11 being more firmly pressed against its seat, but the foam valve 20 is moved away from its seat, as illustrated in Figure 2, thereby allowing the beer to flow through the passage-way 23 and out through the restricted discharge slot or orifice 18. This flow is that of a small volume of beer at high velocity through the slot 18 so that the beer issued from the discharge orifice is foamed and flows as such to the top of the beer previously dispensed into the vessel. A rich, creamy, enduring collar is thus provided on the beer, one in which the globules of gas surrounded by films of the liquor are very finely or minutely divided and in a state of stable dispersion or suspension. When the operator releases the handle 32, the spring 25 automatically returns the valve 20 to a closed position.

While I have shown and described one construction in which the invention may be advantageously embodied, it is to be understood that the construction shown has been selected merely for the purpose of illustration or example, and that various changes in the size, shape, and arrangement of the parts may be made without departing from the spirit of the invention or the scope of the subjoined claims.

I claim:

1. A faucet for dispensing beer comprising a hollow body having inlet and discharge ports, a beer valve therein biased to closed position and operable when opened to provide for flow from the faucet of a relatively large volume of beer at low velocity, a carrier sleeve for said beer valve open to the inlet side of the beer valve and having a valve chamber on the outlet side of the beer valve, said valve chamber having a restricted discharge orifice, a foam valve disposed in said valve chamber in controlling relation to the discharge orifice thereof and operable when opened and the beer valve is closed to provide for flow through the carrier sleeve and through the restricted discharge orifice of the valve chamber of a small volume of beer at high velocity and consequently of the flow of foam from the faucet, a common valve stem for both of said valves extending through said carrier sleeve, a single operating lever fulcrumed on the faucet body and connected to said stem on the outlet side of the beer valve, said foam valve being interengageable with said sleeve to provide a one way driving connection between the stem and the carrier sleeve to move the beer valve to open position when the operating lever is moved in one direction, and a spring connection between the valve stem and the end of the carrier on the inlet side of the valve to provide a yielding driving connection between the stem and the sleeve when the operating lever is moved in an opposite direction to thereby close the beer valve and open the foam valve.

2. A dispensing faucet for carbonated beverages comprising a body having an inlet adapted to be connected to a source of supply of the beverage and also having a discharge spout, said body being provided with a passage-way leading directly from said inlet to said discharge spout, a valve seat in said passageway between said inlet and said spout, a beer valve including an annular valve head disposed on the inlet side of and cooperable with said seat, a carrier sleeve to one end of which said valve head is fixed, said sleeve extending past the seat to the outlet side thereof and being provided with a valve chamber on the outlet side of said seat, said valve chamber having a narrow slot in its periphery providing a restricted discharge orifice therefrom, a foam valve in said chamber for controlling flow through said slot, a valve stem fixed to said foam valve and extending through said sleeve and through and beyond said annular valve head, a coil spring encircling the inner projecting end of said stem and having one end abutting said carrier sleeve, an abutment on the inner end of said stem for the other end of said spring, said faucet body having a guideway coaxially disposed with respect to said valve seat, a valve guide slidable in said guideway and fixed to said valve stem, and an operating lever fulcrumed on the faucet body and operatively interconnected with said valve guide for reciprocating it in its guideway.

3. A dispensing faucet for carbonated beverages comprising a body having an inlet, an outlet, a passageway connecting the inlet and outlet, and a valve seat in the passageway intermediate the inlet and outlet, a beer valve cooperable with the valve seat on the inlet side thereof and operable, when opened, to provide for flow from the outlet of the faucet of a relatively large volume of beverage at a low velocity, a carrier sleeve extending through the valve seat and having the end thereof disposed on the inlet side of said seat fixed to and carrying said beer valve, the sleeve being provided on the opposite side of the seat with a valve chamber having a narrow restricted discharge slot, a valve stem extended through said sleeve, a yieldable connection between the inner end of the stem and the inner end of the sleeve, the stem coacting with the sleeve to define a passage leading from the inlet to the valve chamber, a foam valve fixed to the stem and slidable in said chamber to open and close said discharge slot, and an operating lever fulcrumed on the body and operatively connected to said stem for sliding the same in one direction to open the beer valve while leaving the foam valve closed and for sliding the stem in an opposite direction to open the foam valve while the valve is closed.

4. A faucet of the character described comprising a body having an inlet and a discharge spout and provided with a main passage-way leading directly from the inlet to the discharge spout, said passage-way being provided with a valve seat, a beer valve cooperable with said valve seat and acting when open to permit free flow of fluid from the inlet through the passage-way to the discharge spout, said valve being biased to closed position and having a passage-way therethrough in open communication with the main passage-way on the inlet side of the valve seat and having a restricted outlet in communication with the main passage-way on the outlet side of the valve seat, a foam valve cooperable with the outlet of said restricted passage-way and acting when closed to prevent flow therethrough and when open to permit restricted flow through said restricted outlet, a common stem for both of said valves, said foam valve being fixed to said stem, a yieldable connection between the stem and the beer valve, and a single operating lever for the stem.

5. A faucet of the character described comprising a body having an inlet adapted to be connected to a source of supply of liquid and also having a discharge spout, said body being provided with a main passage-way leading directly from its inlet to said discharge spout, an annular valve seat in said passage-way intermediate said inlet and said discharge spout, a beer valve cooperable with said valve seat and comprising an annular valve member, and a sleeve-like carrier for said annular valve member open to the inlet side of said beer valve and extending therethrough, a valve stem having an outside diameter smaller than the inside diameter of the carrier and extending axially therethrough and shiftable axially with respect thereto, said carrier and said valve stem defining a passage-way open to the inlet side of the valve seat, said carrier having a restricted outlet on the discharge side of the beer valve and leading from said last mentioned passage-way to the discharge spout, a foam valve carried by the stem on the discharge side of the beer valve and acting in one position to block flow through said restricted outlet, a yieldable connection between the valve stem and the carrier on the inlet side of the beer valve, and an operating lever rockably mounted on the body and operatively interconnected with the stem so as to open the beer valve when moved in one direction and open the foam valve when moved in the opposite direction.

CARL L. DAUN.